INVENTOR
Herman Bacharach
by
James C. Bradley

UNITED STATES PATENT OFFICE.

HERMAN BACHARACH, OF PITTSBURGH, PENNSYLVANIA, ASSIGNOR TO BACHARACH INDUSTRIAL INSTRUMENT COMPANY, OF PITTSBURGH, PENNSYLVANIA, A CORPORATION OF PENNSYLVANIA.

DEVICE FOR MEASURING THE VELOCITY OF GASES.

1,419,798. Specification of Letters Patent. Patented June 13, 1922.

Application filed May 21, 1919. Serial No. 298,631.

*To all whom it may concern:*

Be it known that I, HERMAN BACHARACH, a citizen of the United States, residing at Pittsburgh, in the county of Allegheny and State of Pennsylvania, have invented certain new and useful Improvements in Devices for Measuring the Velocity of Gases, of which the following is a specification.

Figure 1:
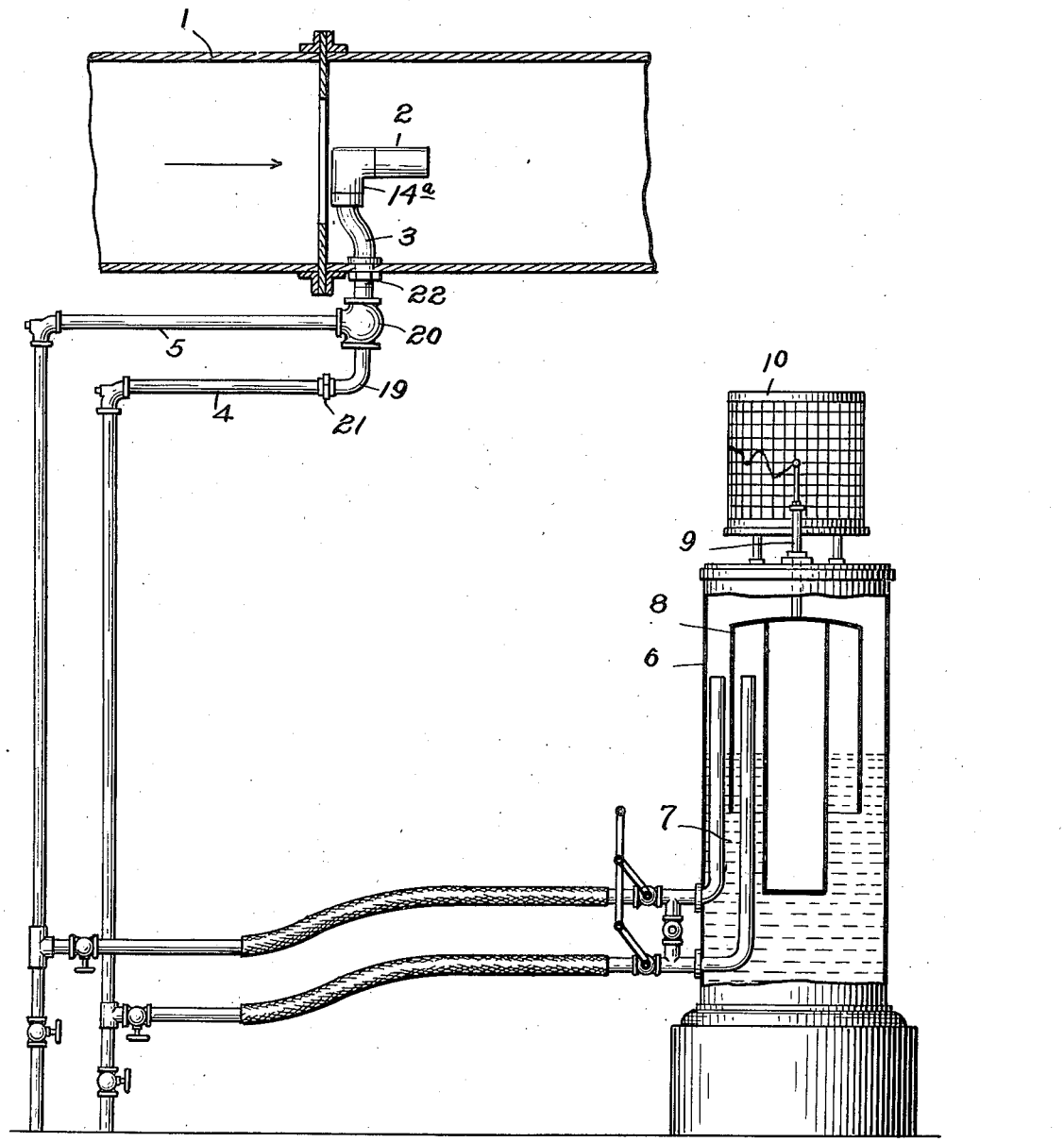
Figure 2:
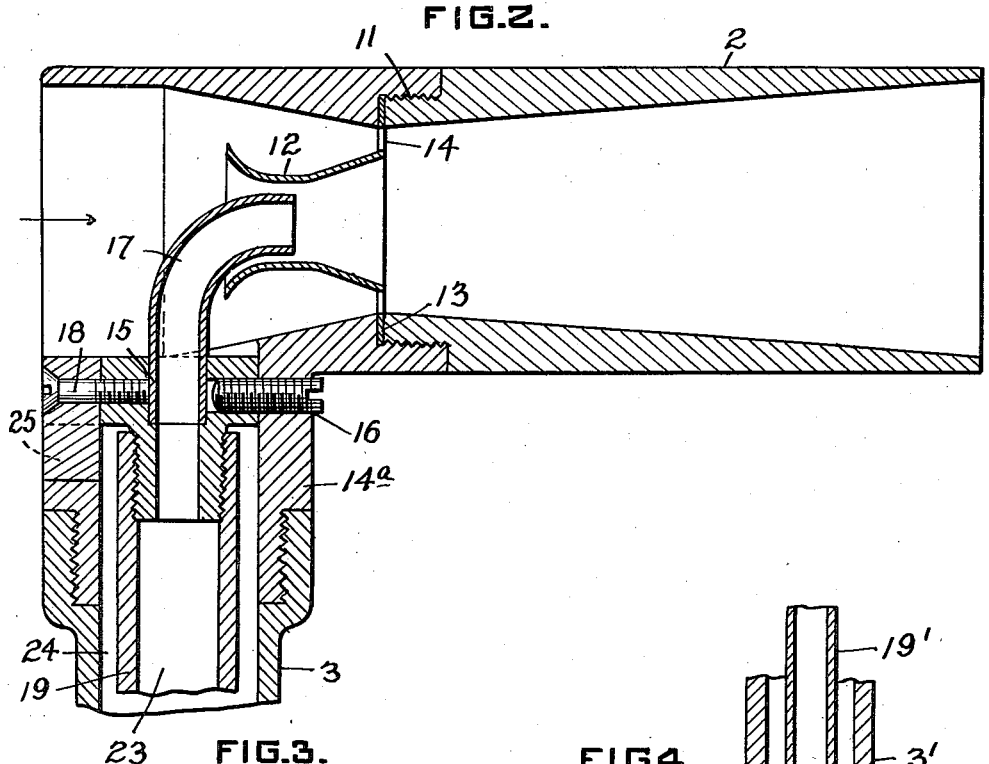
Figure 3:
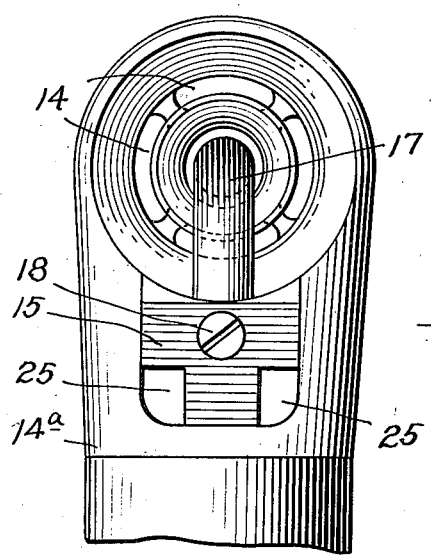
Figure 4:
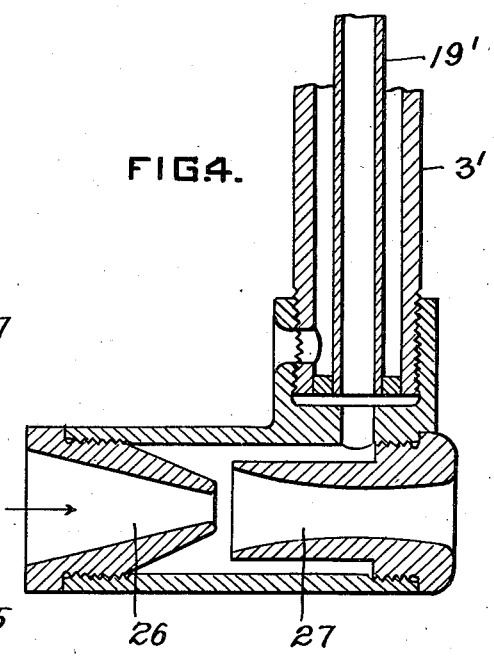

The invention relates to apparatus for use in the determination of the velocity of flowing gases; and has for its primary objects the provision of an improved construction whereby the velocity head of the gas to be measured is magnified rendering it possible to more accurately measure very low velocities. Certain embodiments of the invention are illustrated in the accompanying drawings, wherein;

Figure 1 is an assembly view, partially in section, showing the application or method of use of the apparatus. Figure 2 is an enlarged longitudinal section through that part of the apparatus which lies in the line of flow of the gas to be measured and in which the invention particularly resides. Figure 3 is a rear elevation of the device of Fig. 2. And Figure 4 is an enlarged longitudinal section through a modified form of the apparatus.

Referring first to the general arrangement of parts as shown in Figure 1, 1 is a pipe containing a flowing gas whose velocity is to be determined; 2 is a Venturi tube shown in detail in Figure 2 and preferably positioned at the center of the pipe 1 as indicated; 3 is a casing comprising a pair of concentric pipes or passages connected respectively to the pipes 4 and 5; 6 is a manometer casing containing a liquid 7 and a float 8; 9 is an indicator rod carried by the float and provided with a pencil; and 10 is a drum provided with a recording strip and rotated in the usual way by any suitable mechanism. The pipes 4 and 5 are provided with suitable valves as shown, such pipes and the manometer structure being old and well known in the art for which various other arrangements and pressure measuring instruments may be substituted if desired.

Figure 2 illustrates one type of that part of the apparatus in which the invention particularly resides designed to be placed in the flow of gas and magnify the velocity head, so that very low velocities may be measured. The casing 2 is in two parts screw threaded together as indicated at 11 and having its interior tapered to form a Venturi tube. In this tube is mounted a second Venturi tube 12 having its down-stream end opposite that portion of the tube 2 having the least diameter. The tube 12 has its down-stream end 13 turned out and clamped between the ends of the tube parts constituting the tube 2. This end 13 is cut away forming a spider with the spaces 14 (see Fig. 3) to permit the passage of gas.

The forward portion of the tube 2 is provided with a downwardly extending shank 14ª to which the casing 3 is threaded. Mounted in the top of the shank 14ª is the plug 15 held in position by the set screw 16 and carrying the elbow 17, such elbow being secured in place by the screw 18. A pipe 19 is threaded to the lower end of the plug, such pipe 19 extending through the T 20 (Fig. 1) and being connected to the pipe 4 by the coupling 21.

The casing 3 extends through the casing of the pipe 1, being held in position by the nut 22 and connected to the T 20. A pair of concentric passages 23 and 24 are thus provided, the inner of which communicates with the elbow 17. The outer passage 24 communicates with the interior of the pipe 1 by means of two passages 25 (Fig. 3) formed by cutting away the corners of the plug 15. It will therefore be seen that communication is made from the elbow 17 to the interior of the float 8 via the pipes 19 and 4, and that communication is made from the opening 25 to the space in the casing 6 outside the float via the casing 3, T 20 and pipe 5.

A differential pressure effect is thus secured upon the float from the flowing gas in the pipe 1. On the one hand the dynamic head of the flowing gases is applied against the openings 25 thus increasing the pressure upon the outside of the float, while on the other hand a suction or drag is secured upon the gas in the elbow 17 and the pressure inside the float correspondingly reduced.

The arrangement of the two Venturi tubes in connection with the elbow provides for a very considerable magnification of the drag upon the column of gas in the elbow 17. The outer Venturi tube 2 provides for an increased velocity at the portion of smallest diameter so that the viscous drag of flowing gases upon the gas in the inner Venturi tube 12 is increased. This increases the velocity of the gases in the second tube which velocity is greatest at the point of smallest diameter where the elbow 17 terminates, so that a maximum drag is secured upon the gas in the elbow. The principle might obviously be carried somewhat farther by still further multiplication of Venturi tubes.

Figure 4 shows another embodiment of the invention in which the converging tube 26 takes the place of the Venturi tubes of the device of Fig. 2 and the member 27, taken in connection with the surrounding chamber and the lateral outlet, takes the place of the elbow 17, such parts in effect constituting an elbow and performing the functions of the elbow 17. The pipe $19^1$ and casing $3^1$ correspond to the parts 19 and 3 respectively of Fig. 2, being connected to the manometer in the same way. The gas passing through the tube or nozzle 26 reaches a maximum velocity at the reduced end thereof and this stream of gas passing through the end of the member 27 entrains the gas therein and produces a reduction in pressure which is communicated to the tube $19^1$.

The foregoing illustrate two of the simplest embodiments of the invention, but it will be understood that the invention may be applied in many other different forms including either the tapering tube or the Venturi tube adapted to be placed in a flowing stream of gas for the purpose of securing a magnification of the drag induced by the gas for the purpose of determining measurement. The device may be easily applied, is inexpensive and not liable to get out of order, and can be made of such size that it does not interfere to any extent with the flow of the gas in the main to which it is applied. It will be understood that the device may be mounted in a pipe or main as indicated in Fig. 1 and left there indefinitely to record the velocity of the fluid in the pipe, or if desired, it may be held or placed temporarily in any flowing stream or moving body of fluid in order to determine its velocity.

What I claim is:

1. A flow measuring device comprising a tube adapted to be inserted into a main carrying a current of gas to be measured and converging down-stream thereof, a stem for said tube adapted to pass through the wall of the main and constitute a support for the tube and comprising a pair of pipes, one of such pipes opening at its end into the tube and being directed toward the down-stream end of the tube, and the other of such pipes opening at its end outside the tube and in a direction opposite to the end of the other tube and toward the flow of gas.

2. A flow measuring device comprising a converging tube adapted to be placed in a current of gas to be measured and converging down-stream thereof, and a pair of pipes connected to the tube and constituting a support for the tube when inserted in the current to be measured, one of such pipes opening at its end into the tube at its reduced portion and being directed toward the down-stream end of the tube, and the other opening at its end outside the tube and in a direction opposite to the end of the other tube.

3. A flow measuring device comprising a Venturi tube adapted to be placed in a current of gas to be measured, and a pair of pipes connected to the tube, one of such pipes opening at its end into the throat of the tube and the other pipe opening at its end outside the tube, and such open ends of the pipes being directed in opposite directions.

4. A flow measuring device comprising a supporting stem provided with two passages and adapted to be inserted in the wall of a main carrying a current of gas to be measured, a Venturi tube carried by the stem, a connection to one passage, having its end in the reduced portion of the tube and opening down-stream, and a connection to the other passage having an inlet outside the tube and opening upstream.

5. A flow measuring device comprising a Venturi tube adapted to be placed in a current of gas to be measured and a pair of pipes leading therefrom, one of such pipes having its end in the reduced portion of the tube and directed down-stream and the other having its end outside the tube and directed up-stream.

6. A flow measuring device comprising a Venturi tube adapted to be mounted in the current to be measured, a second Venturi tube mounted in the first tube with its down-stream end within the portion of first tube of least diameter, an elbow leading from the reduced portion of said second tube and having its end opening down-stream, and a pipe leading from a point adjacent the tube and opening up-stream.

7. A flow measuring device comprising a converging tube adapted to be placed in a current of gas to be measured, and a pair of concentric pipes connected to the tube, one of such pipes opening at its end into the tube at its reduced portion and being directed toward the down-stream end of the tube, and the other opening at its end outside the tube and being directed in a direction opposite to the end of the other tube.

HERMAN BACHARACH.